Dec. 31, 1963   W. SCHAEFER ETAL   3,116,413
APPARATUS FOR THE ANALYSIS OF GAS MIXTURES
BY ABSORPTION OF RADIATION
Filed June 29, 1960
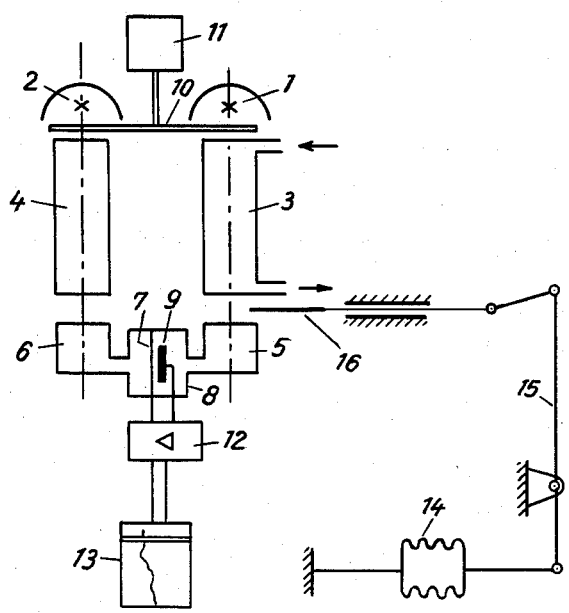

United States Patent Office 3,116,413
Patented Dec. 31, 1963

3,116,413
APPARATUS FOR THE ANALYSIS OF GAS MIXTURES BY ABSORPTION OF RADIATION
Werner Schaefer, Offenbach (Main), and Wolfgang Siebert, Schriesheim, Bergstrasse, Germany, assignors to Hartmann & Braun Aktiengesellschaft, Frankfurt am Main, Germany, a corporation of Germany
Filed June 29, 1960, Ser. No. 39,555
Claims priority, application Germany July 4, 1959
3 Claims. (Cl. 250—43.5)

This invention relates to an apparatus for analyzing gases by absorption of radiation. The apparatus provides two paths of rays, one leading through a chamber containing the gas under test to a receiver and the other through a chamber containing the reference gas to another receiver. The energy of radiation is measured in the receivers and from the difference between the energy of radiation measured in the two receivers the content of the gas component in the measuring chamber absorbing the radiation is determined.

The invention especially relates to an analyzer whereby in the suppression of the initial range the concentration of the component to be determined is measured from a predetermined value. The purpose of the invention is to render the indication of such an analyzer independent from the gas pressure in the chamber since pressure changes of the gas under test produce an error of measurement in case of gas analyzers based on the principle of radiation absorption. If the measuring range starts with concentration zero of the gas under test the error is considerably small. Consequently in most cases this error need not be corrected. This does not apply, however, if the concentration of a certain component in the gas mixture under consideration is to be measured from a certain initial value differing from zero, i.e. if for increasing the measuring sensitivity within a certain range of concentration the initial range below this range of concentration is suppressed. The measuring error will be high especially if the suppressed initial range is large compared with the measuring range of the analyzer.

In this case measuring errors due to pressure fluctuations may assume such values compared with the measuring effect proper that the whole measurement becomes senseless. This deficiency is removed by the invention by rendering the suppressed range dependent on the gas pressure in the measuring chamber because said pressure acts on a pressure sensitive element displacing a shutter in one of the paths of rays which is masked to a higher or lesser degree.

The illustration shows an example of the invention. The radiation required for the measurement is introduced by two sources 1 and 2. Generally an infrared source is used for this purpose. The radiation originating from source 1 and directed in parallel by a mirror passes through chamber 3 filled with the gas mixture to be analyzed. The radiation of source 2 passes through chamber 4 filled with the reference gas. Chambers 5 and 6 are filled with the component of interest in the analysis gas and serve as radiation receivers. Another chamber 8 divided by membrane 7 is connected on both sides of membrane 7 to each one of chambers 5 and 6. This membrane consists of conductive material or is fitted with a conducting layer. Opposite the electrode plate 9 is arranged the membrane 7, the membrane and plate 9 thus constituting together a membrane condenser. The rotating shutter 10 driven by motor 11 interrupts both paths of rays periodically and in phase. The output of membrane condenser 7, 9 is connected to the input of amplifier 12 the output D.C. of which is recorded by instrument 13.

*Principle of operation.*—The gas component to be measured absorbs in chamber 3 part of the infrared radiation within a wave length specific for the gas. Both chambers 6 and 5 are filled with this gas under test. Consequently they essentially absorb only those wave lengths which are absorbed by the gas under test. In this way the instrument is made sensitive to certain gases. The concentration of the measuring gas in chamber 3 is in accordance with the content of the gas different from that in chamber 4 and therefore the quantity of rays absorbed in receivers 5 and 6 is different.

This produces temperature differences and corresponding pressure differences in chambers 5 and 6. By switching in the rotating shutter 10 masking periodically the radiation through the two chambers the pressure differences are modulated and by applying a voltage to condenser 7, 9 an A.C. voltage is fed to amplifier 12 the amplitude of which corresponding to the difference of absorbed radiation and consequently to the concentration of the two gases. The amplifier amplifies the voltage amplitudes and transforms them into a current proportionate to this amplitude which is indicated by instrument 13.

If the content of a certain gas is to be measured from concentration zero the reference chamber 4 only contains carrier gas. If, for instance, the content of $CO_2$ in air is to be determined the chamber 4 contains pure air. However it often happens that measurement is not to be effected from concentration zero but with suppressed zero point. Suppose the change of concentration of carbonic acid in air is to be measured within a range of 50 and 55%. For such measurement the initial range must be disposed at 50%, i.e. the zero point must be suppressed. This is only achieved by filling chamber 4 with a reference gas containing a certain quantity of the component to be analyzed corresponding to the range to be suppressed, i.e. in the present case 50% $CO_2$. Electrical suppression is also possible by cancellation of the current produced by the amplifier for the initial range by a constant current source applying an oppositely directed current to the measuring instrument.

In case of such zero suppression the indication highly depends on the pressure of the gas under test. In case of the above mentioned example where the $CO_2$-content is to be measured between 50 and 55% such a pressure change would be ten times more effective than of an analyzer with indication from zero to 5% $CO_2$. For eliminating this error as shown in the illustration we provide for a pressure measuring unit 14, e.g. an evacuated bellows which via lever 15 inserts more or less shutter 16 in the path of rays of one of the chambers, in case of the example the measuring chamber. The pressure of the gas under test acts on bellows 14. In case of the example this is achieved by conducting the measuring gas into the open air and by arranging the pressure measuring unit 14 also in the free atmosphere. If the measuring gas is exposed to a pressure differing from the atmospheric pressure the pressure measuring unit 14 is placed into a container connected to the lead of the measuring gas.

We claim:

1. An instrument for analyzing gases by absorption of radiation comprising radiant energy source means for producing a pair of beams; a pair of containers for gases and transparent to said beams and in the paths thereof, one container being for a reference gas and the other being a sample container; detector means for comparing the amount of radiation absorbed by the gaseous contents of the respective containers, and means for varying the strength of the beam passing through the sample container in accordance with the total pressure of the gas therein to compensate detector means indications in accordance with pressure variations of the sample gas in the sample container.

2. An instrument for analyzing gases by absorption of radiation comprising radiant energy source means for producing a pair of beams; a pair of containers for gases and transparent to said beams and in the path thereof, one container being for a reference gas and the other being a sample container; detector means for comparing the amount of radiation absorbed by the gaseous contents of the respective containers, a movable shutter between the source and the detector means, and means for varying the position of the shutter in accordance with the total pressure of gas within the sample container to modify indications by the detector means to compensate for variations in total pressures to sample gas.

3. An instrument as claimed in claim 2, the shutter being between the container and the detector means.

References Cited in the file of this patent

UNITED STATES PATENTS

| | | |
|---|---|---|
| 2,875,340 | Liston | Feb. 24, 1959 |
| 2,986,633 | Martin | May 30, 1961 |

FOREIGN PATENTS

| | | |
|---|---|---|
| 727,600 | Great Britain | Apr. 6, 1955 |
| 812,946 | Great Britain | May 6, 1955 |